US008200801B2

(12) United States Patent
Scheid

(10) Patent No.: US 8,200,801 B2
(45) Date of Patent: *Jun. 12, 2012

(54) SIMULTANEOUS DATA BACKUP IN A COMPUTER SYSTEM

(75) Inventor: William B J Scheid, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/873,203

(22) Filed: Aug. 31, 2010

(65) Prior Publication Data

US 2011/0047342 A1    Feb. 24, 2011

Related U.S. Application Data

(62) Division of application No. 11/459,904, filed on Jul. 25, 2006, now Pat. No. 7,836,161, which is a division of application No. 10/273,653, filed on Oct. 18, 2002, now Pat. No. 7,117,324.

(51) Int. Cl.
G06F 13/00    (2006.01)

(52) U.S. Cl. ........ 709/223; 709/203; 709/202; 711/162; 711/161

(58) Field of Classification Search .................. 709/227, 709/228, 224, 223, 202, 203; 711/161, 162
See application file for complete search history.

(56) References Cited

U.S. PATENT DOCUMENTS

| | | | |
|---|---|---|---|
| 5,720,036 A | 2/1998 | Garfinkle et al. | |
| 5,778,395 A | 7/1998 | Whiting et al. | |
| 5,818,723 A | 10/1998 | Dimitri | |
| 5,983,316 A | 11/1999 | Norwood | |
| 6,105,067 A | 8/2000 | Batra | |
| 6,148,412 A | 11/2000 | Cannon et al. | |
| 6,317,814 B1 | 11/2001 | Blendermann et al. | |
| 6,374,336 B1 | 4/2002 | Peters et al. | |
| 6,640,278 B1 | 10/2003 | Nolan et al. | |
| 6,944,654 B1 | 9/2005 | Murphy et al. | |
| 7,117,324 B2 | 10/2006 | Scheid | |
| 7,539,735 B2* | 5/2009 | Fruchtman et al. | 709/223 |
| 7,836,161 B2 | 11/2010 | Scheid | |
| 2002/0103889 A1 | 8/2002 | Markson et al. | |
| 2003/0172130 A1* | 9/2003 | Fruchtman et al. | 709/219 |
| 2003/0200275 A1 | 10/2003 | Hirabayashi et al. | |
| 2004/0054656 A1 | 3/2004 | Leung et al. | |
| 2006/0271622 A1 | 11/2006 | Scheid | |

OTHER PUBLICATIONS

First Office Action dated Oct. 7, 2008, pp. 1-9, for U.S. Appl. No. 11/459,904 by inventor W.B. Scheid.

Response dated Jan. 7, 2009, pp. 1-11, to First Office Action dated Oct. 7, 2008, pp. 1-9, for U.S. Appl. No. 11/459,904 by inventor W.B. Scheid.

Final Office Action dated Apr. 17, 2009, pp. 1-8, for U.S. Appl. No. 11/459,904 by inventor W.B. Scheid.

(Continued)

*Primary Examiner* — Kenneth R Coulter
(74) *Attorney, Agent, or Firm* — David W. Victor; Konrad Raynes & Victor LLP

(57) ABSTRACT

A data processing system using a client-server configuration includes a method and apparatus for simultaneously generating multiple copies of data sets in multiple storage pools. Simultaneous copies of data sets may be made for storage pools having LAN-free paths in addition to storage pools having only access from a LAN path.

8 Claims, 5 Drawing Sheets

OTHER PUBLICATIONS

Response dated Jun. 22, 2009, pp. 1-11, to Final Office Action dated Apr. 17, 2009, pp. 1-8, for U.S. Appl. No. 11/459,904 by inventor W.B. Scheid.

Third Office Action dated Oct. 6, 2000, pp. 1-8, for U.S. Appl. No. 11/459,904 by inventor W.B. Scheid.

Response dated Jan. 6, 2010, pp. 1-11, to Third Office Action dated Oct. 6, 2009, pp. 1-8, for U.S. Appl. No. 11/459,904 by inventor W.B. Scheid.

Second Final Office Action dated Apr. 16, 2010, pp. 1-12, for U.S. Appl. No. 11/459,904 by inventor W.B. Scheid.

Response dated Jun. 16, 2010, pp. 1-10, to Second Final Office Action dated Apr. 16, 2010, pp. 1-12, for U.S. Appl. No. 11/459,904 by inventor W.B. Scheid.

Notice of Allowance dated Jun. 28, 2010, pp. 1-10, for U.S. Appl. No. 11/459,904 by inventor W.B. Scheid.

Notice of Allowance dated Jun. 13, 2006, pp. 1-9, for U.S. Appl. No. 10/273,653 by inventor W.B. Scheid.

* cited by examiner

US 8,200,801 B2

SIMULTANEOUS DATA BACKUP IN A COMPUTER SYSTEM

CROSS-REFERENCE TO RELATED APPLICATIONS

This application is a divisional of U.S. Ser. No. 11/459,904, now U.S. Pat. No. 7,836,161, filed on Jul. 25, 2006, issued on Nov. 16, 2010, which is a divisional application of Ser. No. 10/273,653, now U.S. Pat. No. 7,117,324, filed on Oct. 18, 2002, issued on Oct. 3, 2006, which patents are incorporated herein by reference in their entirety.

BACKGROUND OF THE INVENTION

1. Field of the Invention

The present invention relates in general to data backup in networked computer systems; and, in particular, to simultaneous data backup with multiple destinations on one or more hosts in data processing systems.

2. Description of the Background Art

Data processing systems, particularly networked computer systems, manipulate large sets of data and typically employ large amounts of data storage. Physical data storage devices are not infallible; therefore, most large data processing systems have provisions to generate and store one or more copies of data sets. Data sets are contained in files used by the computer system. The data sets can contain lists of instructions in a program, contents of a data base, portions of the operating system, and the like. It is customary to create multiple copies of important data sets to insure redundancy and to enhance the ability to recover from a disaster. If a primary data set is damaged or destroyed by a failure of a storage device, operator error, or other causes, the copied version of the data set may be summoned. A robust data processing system with accessible copies of important data allows the user to quickly recover from these failure mechanisms with minimal disruption to normal operations.

One known backup method is to periodically copy data from a primary storage pool such as a group of disk drives to a secondary storage pool such as another group of disk drives, tape drives, or optical drives. This method is reasonably effective, but both writing the copied data and retrieving the copied data is typically somewhat slow. Data mirroring is also a known method for generating a copy of data. For data mirroring to be effective, the storage devices for both the primary and the copied data should be the same type and format. For example, if a 40 gigabyte SCSI disk drive contains data and is to be efficiently used with data mirroring, then the device for the copied data should also be a 40 gigabyte SCSI disk drive. Contemporary storage systems usually have a large number of different storage device types. Thus the use of mirroring is more and more constrained as storage systems become more diverse in storage device types. Furthermore, mirroring is usually implemented for storage devices which are in close proximity. Therefore mirroring is not adequate protection against a loss of data due to a disaster.

Client-server systems have been developed to satisfy many computing needs including management of stored sets of primary and copied data. The client in a client-server system usually generates data sets or modifies existing data sets. The server in a client-server system typically manages backup functions including generating copies of data sets, sending data to a designated storage device, and retrieval of data sets. Servers may be configured to be less dependent on having identical storage device types. Typically, a server system contains several storage devices types and has a hierarchical storage manager program to manage the storage devices. However, client-server systems are usually connected with a local area network (LAN), and moving large sets of data over the LAN can have a significant undesirable impact on client-server performance. An improvement in the efficiency of creating backup data sets within a server-client system is obtained by copying only those portions of data sets which have been modified by the user.

Storage area networks (SAN) are rapidly becoming a preferred system to manage data storage in network systems. A SAN is a network of storage devices and one or more hosts connected to those storage devices. A typical SAN may be connected with a LAN client-server, or may be connected in a LAN-free environment. A SAN can be built using a number of technologies, such as a multi-host SCSI chain, SCSI over Fibre Channel, iSCSI or any other connection technology that meets the technical definition. LAN-free typically refers to backup/archive operations where the data to be stored is transferred over the SAN directly from the client host system to one or more storage devices. One of the advantages of a SAN is that the transfer of large data sets to and from storage devices is relatively efficient. Using a SAN to move large amounts of data effectively releases LAN resources and leads to better LAN performance. Another advantage of SAN systems is that management of the physical storage devices is simplified. A SAN enables the transfer of data sets in a more direct path from one data storage device to another while consuming fewer network resources. SAN systems can make use of a storage agent to offload some of the routine tasks of data set storage management from a SAN controller or server. A storage agent typically has a limited subset of functionality of a server or host system.

A disadvantage of existing systems is that a storage agent may not have physical access to all the storage devices required to create and store multiple copies. The physical devices may reside on another SAN or may be directly attached to a server. Therefore a system is needed which has the ability to offload the backup functions to a storage agent and perform simultaneous backup operations for storage devices connected to other SANs or LANs. Also a method and system is needed to create multiple copies of data sets during backup or archive operations where the destinations of the storage volumes reside on multiple hosts.

SUMMARY

The present invention provides for a method and apparatus to enable a SAN system to create and update multiple backup copies of data sets. The backup copies may be created efficiently and written simultaneously to multiple destinations on multiple hosts. In one embodiment, most of the backup activities may be controlled directly by a storage agent using minimal network resources. In another embodiment, some of the storage pools have a LAN-free path and some are connected to another SAN or to a server by way of a LAN. A data set to be copied to a storage pool connected to a LAN passes through an associated LAN server.

The present invention enables the storage agent to efficiently pass the data set to the server to be copied to the LAN connected storage pools, and to selectively manage the storage pools having a LAN-free path.

An embodiment of the present invention in a LAN-free environment includes the creation of an output queue prior to moving a data set. Upon receiving a request to backup the data set, the output queue is created by a producer thread which frames the data set. Usually there are multiple copies of data sets to be sent to multiple destinations. The consumer thread reads the data set from the queue and the data is written to multiple destination pools. The creation of the output queue and the subsequent tasks of copying the data set is conveniently controlled by the storage agent.

Another embodiment of the invention, where some storage pools have LAN-free paths and some do not, includes the creation of a new structure called a network queue manager (NQM). The NQM in a client acts as a consumer thread to the storage agent output queue. Upon connecting with the server, the NQM creates an output queue, starts the consumer threads, and becomes the producer thread. The NQM coordinates the LAN-only storage pool activity with the server. An important advantage of using the NQM is that the data set is sent only once over the network, this is especially advantageous when there are multiple storage destinations.

The objects, features, and advantages of the invention will be apparent from the following detailed description, along with the illustrations, of the preferred embodiment of the invention.

DETAILED DESCRIPTION

It will be useful to explicitly define the terms used in the following detailed description of the invention. Therefore the following glossary is offered to insure consistently understood definitions:

Frame data—organizing header information for data on a queue,

LAN-free path—a direct path from a client host to a storage device, volume, or pool (usually through a SAN), Network Queue Manager (NQM)—a novel structure acting as a consumer thread of the queue in a storage agent, also acting as a producer thread on the server in a LAN-free environment allowing the usage of multiple destinations during a storage operation (described in more detail below), Queue—the staging location of data which is to be moved to or from one or more storage devices or processors, Producer/Consumer—a producer posts data onto the queue and a consumer extracts data from the queue, Storage agent—an application or process which handles a subset of the data copy and backup functions, the storage agent usually resides on a client system which and can communicate with a SAN, Storage pool—a set of volumes of the same type, Primary storage pool—a named set of volumes that are used to store backup versions of files, archive copies of files, and store files from other sources, Copy storage pool—a named set of volumes that contain copies of files that reside in primary storage pools; copy storage pools are used only to back up the data stored in primary storage pools, Volume—a basic unit of storage in storage pools, also used for tracking in a storage manager database and recovery log;

a volume can be a logical volume, a file, a specific storage device, or a specific medium such as a tape cartridge; each volume is normally identified by a unique volume identifier.

Figure 1:
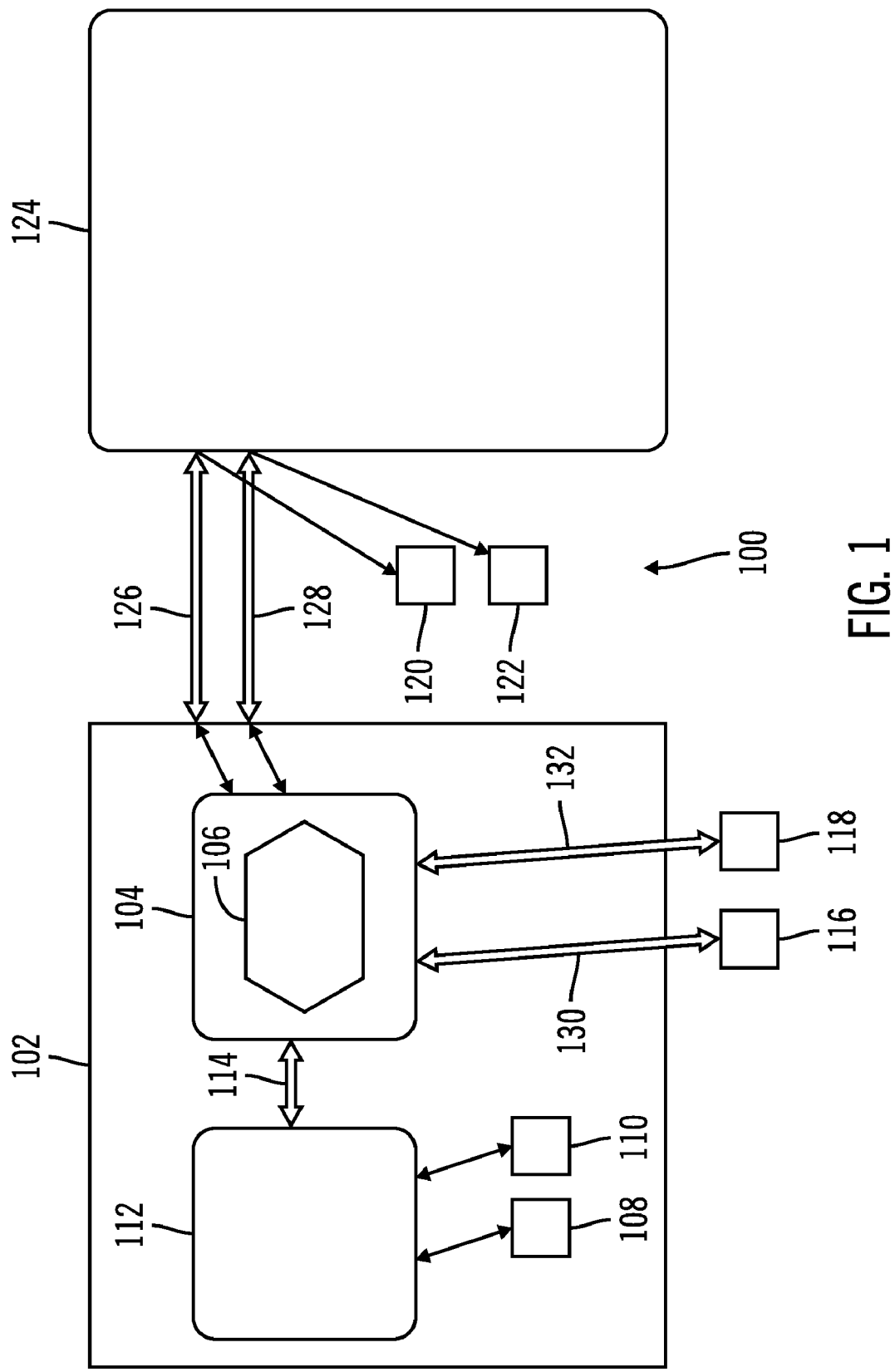
FIG. 1 illustrates an embodiment of the invention wherein a network consumer attaches to the queue, opens a session with the server, and sends data to the LAN-path pool.

FIG. 1 illustrates a first embodiment of the invention to backup a data set from a primary storage pool to multiple backup or copy storage pools. Physically, storage devices of the same type are usually organized together into storage pools. The computer system 100 includes a client 102, a backup/archive client 112, a storage agent 104, and a queue 106. One or more files which are important to client 102 operation such as operating filesystems, databases, and program files may exist in devices such as RAM, a local disk, a RAID, a SAN attached device, or other devices 208, 210. The backup/archive client 112 can directly read and write the information on devices 108, 110. Protection of the data on the devices 108, 110 is achieved by a backup operation using the backup/archive client 112. The backup/archive client 112 connects by way of shared memory connection 114, or other communication method such as TCP/IP, to the storage agent 104 and launches the backup operation. The backup/archive client 112 reads the information from the local devices 108, 110. The storage pool destination for the backup operation includes a list of copy storage pools. For the purposes of explanation, the primary storage pool destination FIG. 1 is labeled with reference number 116. Again for the purposes of explanation, the destinations of the copy storage pools are labeled with reference numbers 118, 120 and 122. Destinations 116 and 118 have a LAN-free path with the storage agent 104. Destinations 120 and 122 are physically coupled to the server 124, or alternatively may reside on another SAN.

Again referring to FIG. 1, the multiple destination queue 106 on the storage agent 104 creates consumer threads for each storage pool destination. For destinations 120, 122, not accessible by the storage agent 104, the consumer thread creates LAN connections 126, 128 to the server 124. The client 112 creates a data set from the information residing on local storage devices 108 or 110, or both 108 and 110. The backup/archive client 112 sends the data to the storage agent 104. The storage agent 104 producer thread queues the data set into the queue 106. Each consumer thread writes the data to the destinations via connections 126, 128, 130, and 132.

Again referring to FIG. 1, consider the example that the client 102, after creating or modifying a data set, requests that the data set be stored on primary storage pool A 116, and that backup copies be stored on storage pool B 118, storage pool C 120 and storage pool D 122. Storage pools A 116 and B 118 are available to the client 102 via SAN connection 130 and SAN connection 132 respectively. Storage pools A and B could also be available on a single SAN. Copy storage pools C 120 and D 122 are connected to the server 124. Volumes C 120 and D 122 are accessible to the client 102 only over the LAN. The storage agent 104 in the client 102 directly accesses storage pool A 116 to store the primary copy of the data set. The storage agent 104 uses the SAN 132 to access storage pool B 118. A simple method of moving the data set to each LAN path storage pool 120, 122 is to open separate TCP/IP network sessions 126, 128 to the server 124 for each of the LAN connected volumes 120, 122. For example, one network session 126 can move the data set from the queue 106 in the storage agent 104 to storage pool C 120, and a second network session 128 can move the data set from the queue 106 to storage pool D 122. This method is not necessarily optimized in the use of network resources since the same data set may be moved multiple times across the network.

Figure 2:
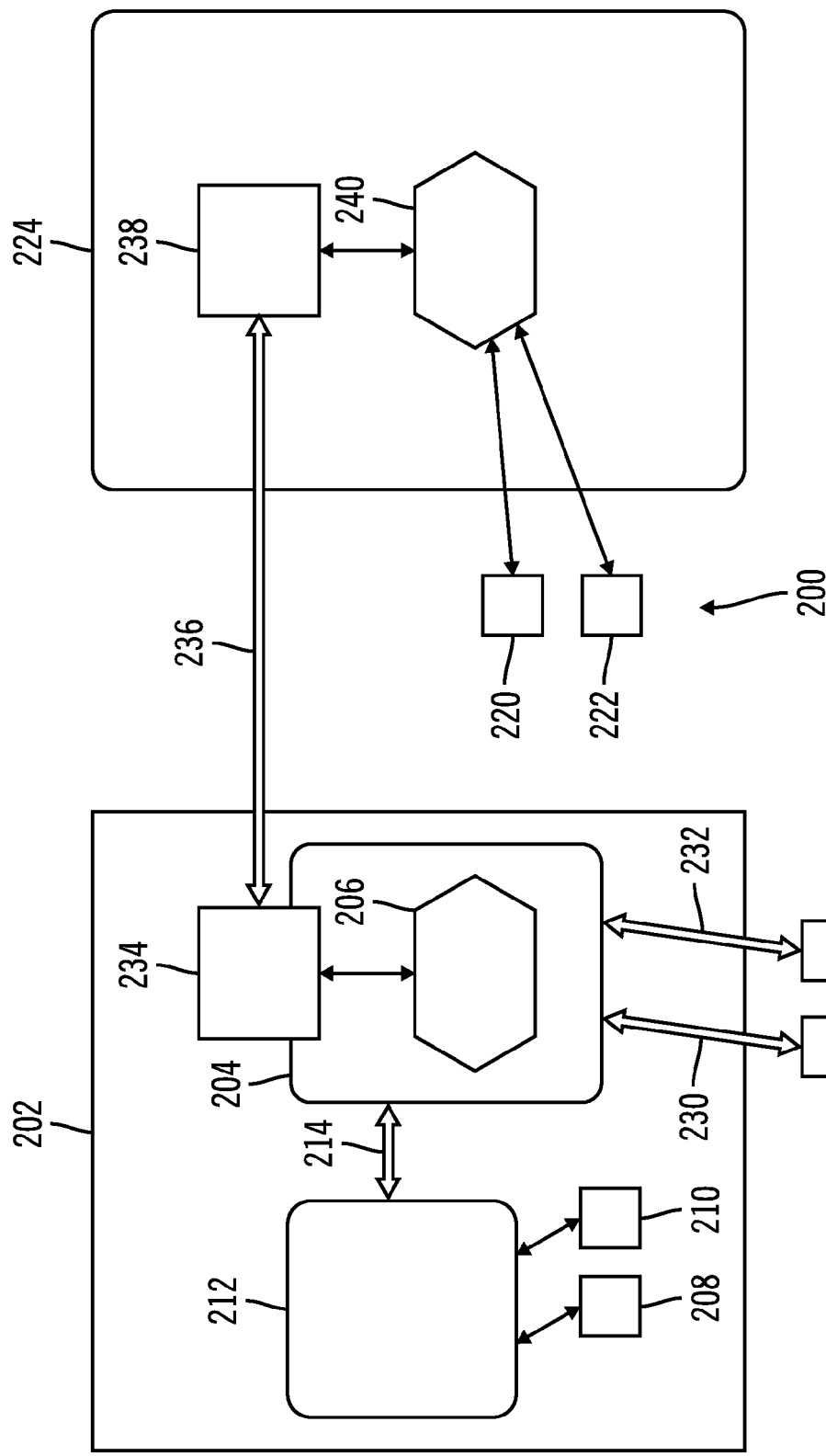
FIG. 2 illustrates an embodiment of the invention wherein a NQM acts as a consumer on the storage agent queue.

FIG. 2 illustrates a preferred embodiment of the present invention. In FIG. 2 the computer system 200 includes a client 202, a backup/archive client 212, a storage agent 204, and a queue 206. The backup/archive client 212 is coupled with the storage agent 204 has access to the data on the local storage devices 208, 210. A novel structure called a network queue manager (NQM) 234 acts as a consumer thread on the client 202 and directs the activities of the client queue 206. Typically, one or more local storage pools 216, 218 are accessible to the client 202 via one or more SANs 230, 232. At least one server 224 is connected to the client 202 by at least one LAN connection 236. The server 224 also has a NQM 238, a queue 240, and attached storage volumes 220, 222. The NQM 238 in the server 224 communicates with the server queue 240 when transferring data sets. The physical storage devices comprising the volumes in the storage pools 216, 218, 220, and 222 may be magnetic disk drives, magnetic tape drives, optical storage devices and the like.

Referring again to FIG. 2, as an example consider a request to store a data set in the client to primary storage pool A 216, and copy storage pools B 218, C 220, and D 222. The data set movement from the client 202 to storage pool A 216 and storage pool B 218 is efficiently managed by the queue 206 and the storage agent 204. The NQM 238 on the server 224 operates as a producer thread and the NQM 234 in the storage agent 204 operates as a consumer thread. The client NQM 234 associated with the storage agent 204 sets up a network session 236 with the NQM 238 in the server 224. The data set is moved only once from the client queue 206 to the server queue 240 using both of the network storage managers 234, 238 (NQM). The data set is moved from the server queue 240 to storage volumes 220, 222 which have no LAN-free paths to the storage agent 204. One of the advantages of the present invention can now be appreciated as the data set was passed only once over the LAN network 236. The data set is written essentially simultaneously on all the storage pools 216, 218, 220, 222.

Figure 3:
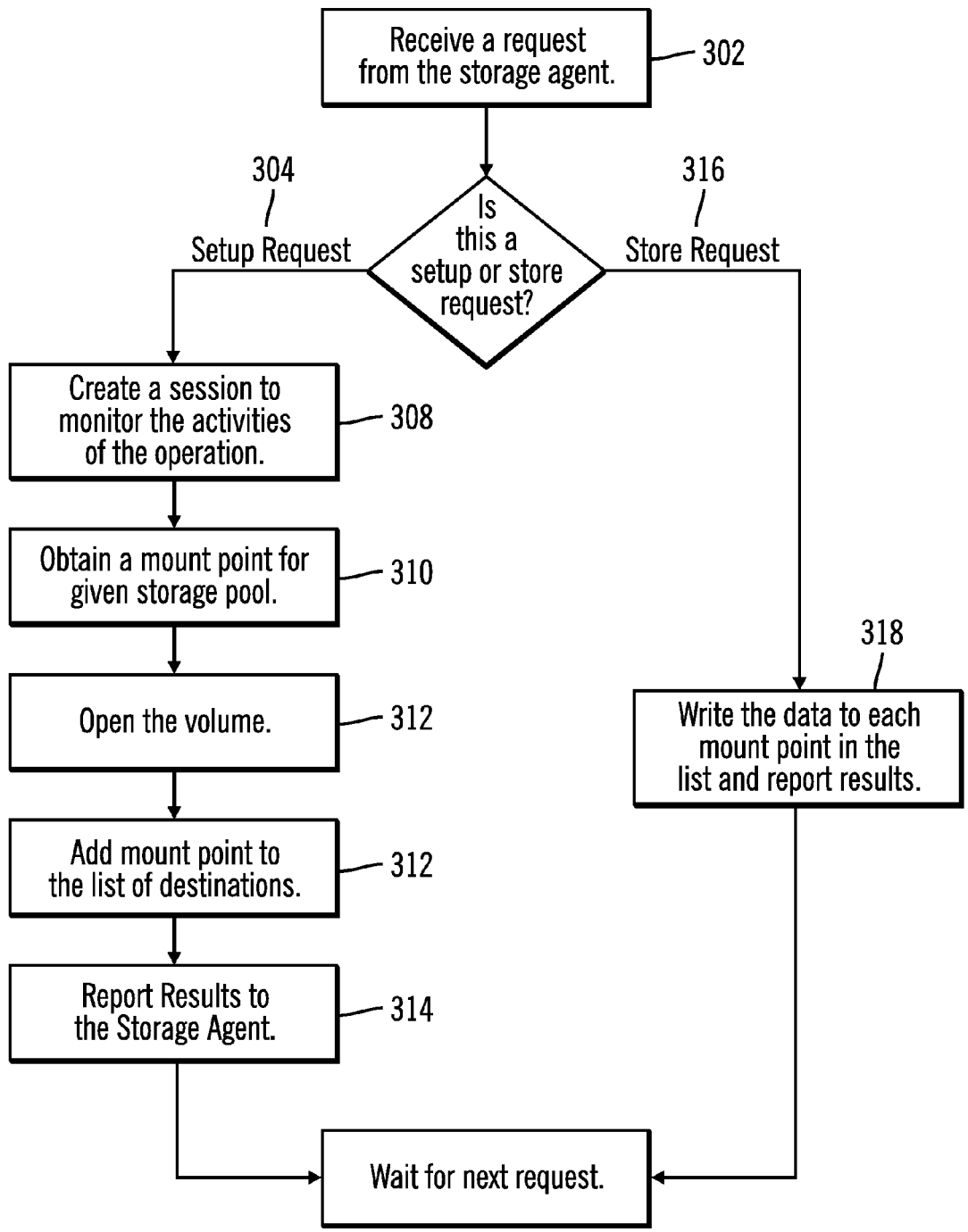
FIG. 3 illustrates the method used in the server to route the copied data.

FIG. 3 illustrates a flow diagram of the actions of one embodiment of a NQM in a server upon receiving a request 302 from a storage agent. If a request 302 from a storage agent is to set up 304 a storage session, then the NQM in the server first verifies and if necessary creates 306 a session to monitor the activities of the operation. The NQM in the server then establishes 308 the location of the targeted local storage pools. A mount point is obtained to physically access the volume in the storage pool. Mount points are usually a reference to a specific physical storage device such as a specific cartridge in a tape drive. Once the mount operation has been completed, the volume is then opened 310. The mount point is added to the list of destinations for future store operations 312. The results of setting up the storage session are then reported 314 to the storage agent. If the request 316 from the storage agent is to write the data set then the data set is written 318 to each of the established mounting points.

Figure 4:
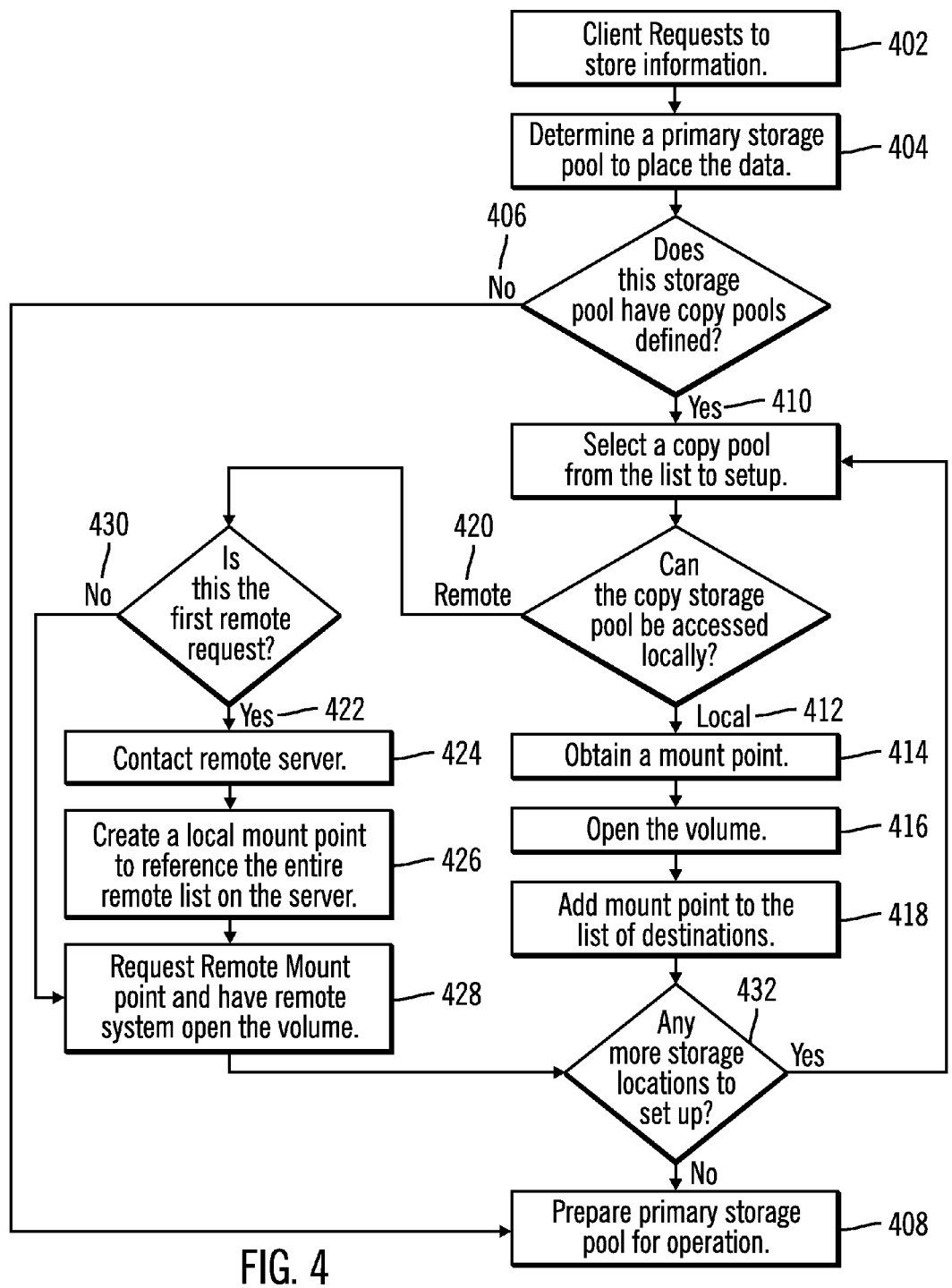
FIG. 4 illustrates the method used for a simultaneous write operation.

FIG. 4 illustrates the actions of a network queue manager (NQM) in a storage agent when a client initiates 402 a storage request involving LAN-free volumes. First a targeted primary storage pool is identified 404 on which to copy a data set. If the primary storage pool does not have an identified copy pool 406 the primary storage pool is setup 408 for the client using a method discussed above and illustrated in FIG. 3. If one or more copy pools have been defined 410, a specific copy pool is selected to be setup.

Again referring to FIG. 4, if the selected copy pool can be accessed locally 412 then a mount point is obtained 414, the volume is opened 416, and the mount point is added to the list of destinations 418. If the copy storage pool is accessed remotely 420, then on the first remote request 422 a remote server is contacted 424, in the remote server a local mount point is created 426 to reference the remote list, and a request is then made for a remote mount point and the volume is opened 428. If the request for the remote storage pool is not the first request 430, then the remote mount point is requested in the server and the volume is opened 428. Once all the storage locations, local and remote, are setup 432 the primary storage pool is prepared for operation 408.

Figure 5:
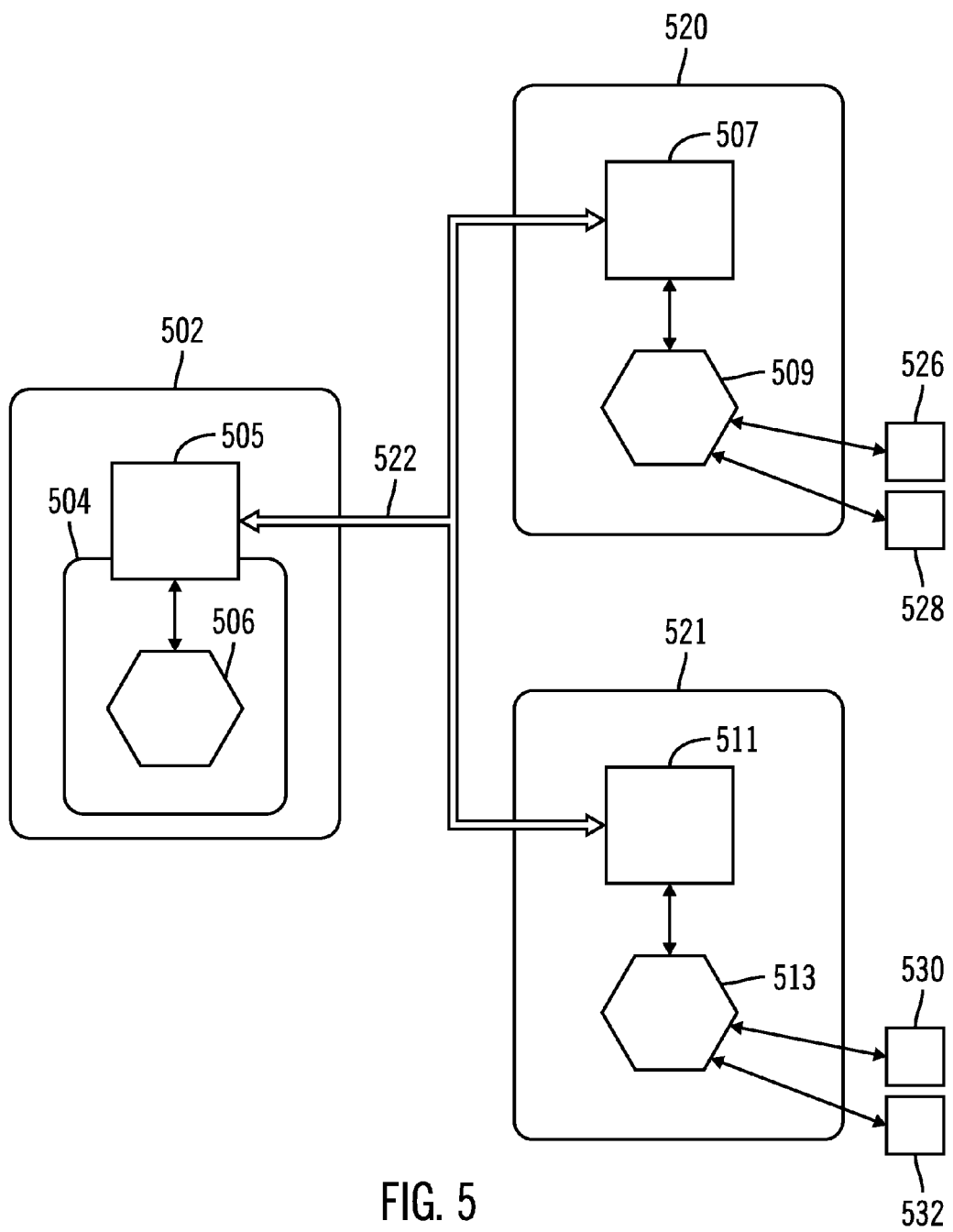
FIG. 5 illustrates an embodiment wherein the copy storage pools exist on two different servers.

In the embodiments of the invention described above, the client has been illustrated as connected to a single server. However, in other embodiments the client may be connected to multiple servers each which may have access to targeted storage devices. FIG. 5 illustrates a client 502 which is connected to two servers 520, 521. Each server 520, 521 has storage volumes 526, 528, 530, 532 which may not have a LAN-free path to the client 502. In this embodiment the client NQM 505 may set up a simultaneous TCP/IP connection 522 to each of the servers 520, 521. Thus, the data set is only transferred once over the network connection 522. The client NQM moves the data set over the network connection 522 through each of the server NQMs 507, 511. The server NQMs 507, 511 then stages the data set on the appropriate server queue 509, 513 to be moved to the storage volumes 526, 528, 530, 532. A plurality of servers may be connected to a client to serve as simultaneous receptors of data sets.

The actions described above and illustrated in FIGS. 3, 4, and 5 may be embodied in a program of executable computer instructions which may cause the data processing system to execute the steps in the program. The program of executable computer instructions may be tangibly embodied in a computer usable medium such as a magnetic disk, a magnetic tape, a program obtained from a network, or the like.

From the foregoing it will be appreciated that the invention provides a novel and advantageous system and method to simultaneously generate backup copies of data sets wherein the targeted storage devices are distributed throughout the data processing system. Although specific embodiments of the invention have been described in detail, the invention is not to be limited to the specific embodiments so described and illustrated. Those skilled in the art will recognize that other forms of the invention are possible without departing from the scope of the invention.

What is claimed is:

1. In a data processing system, a method for creating multiple copies of a data set in storage pools having multiple destinations, comprising:
   storing copies of the data set in locally attached server storage pools with respect to a server;
   storing copies of the data set in client storage pools connected by a first type of network connection to a client;
   receiving a request in the server from a client storage agent in the client to set up a storage session;
   creating a session in the server to monitor the activities of a copy operation;
   establishing, by the server, a location of the client storage pools;
   obtaining, by the server, mount points for volumes in the server and the client storage pools storing the data subject to the copy operation;
   reporting, by the server, results of creating the storage session to the storage agent;
   transferring the data set once from the client to the server over a second type of network connection; and,
   storing, by the server, copies of the data set in the server storage pools using the obtained mount points so that data is written to the client and server storage pools.

2. The data processing system of claim 1, wherein the first type of network connection comprises a Storage Area Network (SAN) and wherein the second type of network connection comprises a Local Area Network (LAN) connection.

3. The data processing system of claim 1, wherein the mount points comprise references to specific physical storage devices.

4. That data processing system of claim 1, wherein storing the copies of the data set comprises writing the data set to the mount points.

5. The data processing system of claim 1, wherein the data set is copied from a primary storage pool of the storage pools connected to the client via the first type of network connection and where the copies of the data set are copied to one storage pool connected to the client via the first type of network connection and to the locally attached server storage pools.

6. The data processing system of claim 1, wherein the client includes a network queue manager to transfer the data sets over the second type of network connection.

7. The data processing system of claim 1, wherein the data set is moved once from the client to the server to store in the server storage pools.

8. The data processing system of claim 1, wherein the client transfers the data set once to a plurality of servers to store in locally attached server storage pools with respect to the servers to which the data set is sent.

* * * * *